US011959376B2

(12) United States Patent
Quintero et al.

(10) Patent No.: US 11,959,376 B2
(45) Date of Patent: *Apr. 16, 2024

(54) DYNAMIC TIME-GATE CEMENT EVALUATION TOOL

(71) Applicant: Halliburton Energy Services, Inc., Houston, TX (US)

(72) Inventors: Luis F. Quintero, Houston, TX (US); Reinaldo Jose AnguloYznaga, Cañada (ES); Ehab Abdel Rahman Ali Najm Abdel Rahman Najm, Abu Dhabi Gate (AE)

(73) Assignee: Halliburton Energy Services, Inc., Houston, TX (US)

( * ) Notice: Subject to any disclaimer, the term of this patent is extended or adjusted under 35 U.S.C. 154(b) by 266 days.

This patent is subject to a terminal disclaimer.

(21) Appl. No.: 16/689,216

(22) Filed: Nov. 20, 2019

(65) Prior Publication Data
US 2020/0088024 A1    Mar. 19, 2020

Related U.S. Application Data

(63) Continuation of application No. PCT/US2019/019858, filed on Feb. 27, 2019.

(60) Provisional application No. 62/646,605, filed on Mar. 22, 2018.

(51) Int. Cl.
*E21B 47/005* (2012.01)
*G01V 1/50* (2006.01)

(52) U.S. Cl.
CPC .............. *E21B 47/005* (2020.05); *G01V 1/50* (2013.01)

(58) Field of Classification Search
CPC ................ E21B 47/005; G01V 1/50

USPC ............................................. 367/35; 181/105
See application file for complete search history.

(56) References Cited

U.S. PATENT DOCUMENTS

| 4,131,875 A | 12/1978 | Ingram |
| 7,414,918 B2* | 8/2008 | Hurst ...................... G01V 1/46 |
| | | 181/105 |
| 7,787,327 B2* | 8/2010 | Tang ..................... E21B 47/005 |
| | | 367/27 |
| 7,911,876 B2 | 3/2011 | Hurst et al. |

(Continued)

FOREIGN PATENT DOCUMENTS

| WO | 2016130599 | 8/2016 |
| WO | 2019182825 | 9/2019 |

OTHER PUBLICATIONS

ISRWO International Search Report and Written Opinion for PCT/US2019/019858 dated Jun. 19, 2019.

*Primary Examiner* — Isam A Alsomiri
*Assistant Examiner* — Vikas Atmakuri
(74) *Attorney, Agent, or Firm* — John Wustenberg; C. Tumey Law Group PLLC

(57) ABSTRACT

A method and system for determining cement bonding, or other materials attached to a pipe string. A well measurement system for determining cement bonding or other materials attached to a pipe string may comprise an acoustic logging tool, wherein the acoustic logging tool comprises at least one receiver and at least one transmitter. The well measurement system may further comprise an information handling system, wherein the information handling system is configured to broadcast a signal with the transmitter, record the reflected signal with a receiver; and determine an integrity of a cement using a Quintero Wellbore Index.

25 Claims, 4 Drawing Sheets

(56) References Cited

U.S. PATENT DOCUMENTS

| | | | |
|---|---|---|---|
| 9,157,312 B2* | 10/2015 | Zhao | G01V 1/44 |
| 9,274,240 B2* | 3/2016 | Frisch | E21B 47/005 |
| 10,655,462 B2* | 5/2020 | Sakiyama | E21B 47/005 |
| 10,920,569 B2* | 2/2021 | Mandal | G01V 1/46 |
| 2010/0118648 A1* | 5/2010 | Zhao | G01V 1/44 |
| | | | 367/35 |
| 2015/0049585 A1* | 2/2015 | Collins | G01V 1/50 |
| | | | 367/35 |
| 2015/0168581 A1 | 6/2015 | Izuhara et al. | |
| 2016/0061021 A1 | 3/2016 | Shaposhnikov et al. | |
| 2016/0334540 A1 | 11/2016 | Quintero et al. | |

* cited by examiner

DYNAMIC TIME-GATE CEMENT EVALUATION TOOL

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

During the lifetime of the well the integrity of the cement used to hold the pipe string and/or casing in place may be examined. Determining the integrity of the cement may help in determining if the pipe string may shift, fail, break, and/or the like. Currently, pipe strings may produce signals and/or interference waves, when excited, that may overshadow signals which may indicate cement bonding to a pipe string and/or a casing. An acoustic logging tool may be utilized to broadcast a signal and record a reverberated signal, which may be processed to determine the material behind a pipe string and/or a casing.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to systems and methods for identifying cement bonding as well as materials behind a pipe string and/or casing with an acoustic logging tool. Acoustic sensing may provide continuous in situ measurements of parameters related to cement bonding to a pipe string and/or a casing. As a result, acoustic sensing may be used in cased borehole monitoring applications. Acoustic sensing may rely on the difference between arrival times of acoustic compressional waves (P Waves) detected from a waveform obtained when using and acoustic sensing logging tool in a borehole. These arrival times may correspond with identified ray paths between a given borehole fluid and cement of different compressive strengths.

Currently, no method or system exists in the oil industry capable of evaluating quantitatively the quality of cement behind pipe, except those which are based on empirical formulas. However, current methods may be qualitative and subjective. These empirical and subjective analysis typically may depend on the expertise of the analyst. A method and system utilizing an index based on fundamental sciences and first principles may remove subjective analysis. The Quintero Wellbore Index ("QWI") may be utilized to remove subjective analysis.

Figure 1:
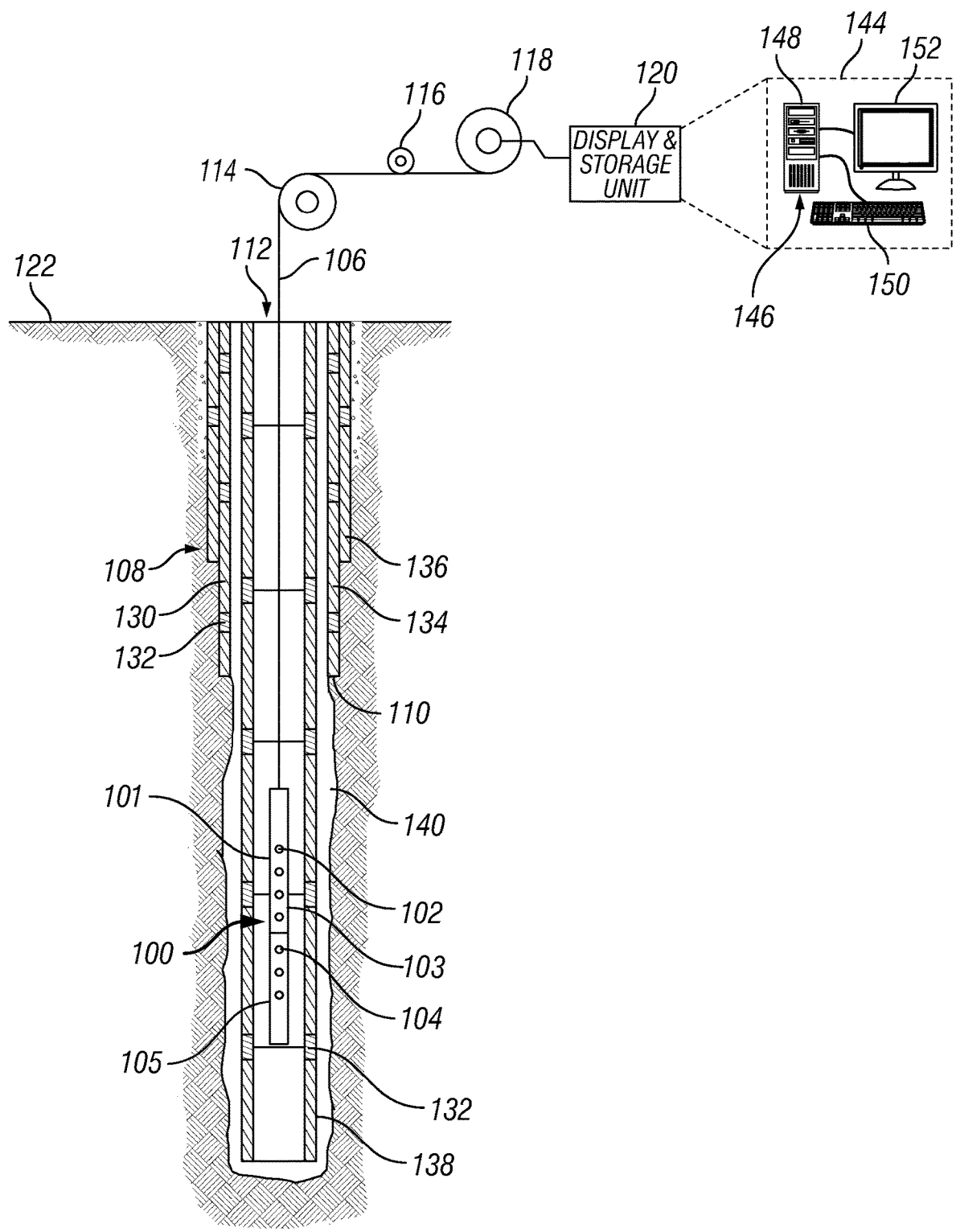
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110. Signals recorded by acoustic logging tool 100 may be stored on memory and then processed by display and storage unit 120 after recovery of acoustic logging tool 100 from wellbore 110. Alternatively, signals recorded by acoustic logging tool 100 may be conducted to display and storage unit 120 by way of conveyance 106. Display and storage unit 120 may process the signals, and the information contained therein may be displayed for an operator to observe and stored for future processing and reference. Alternatively, signals may be processed downhole prior to receipt by display and storage unit 120 or both downhole and at surface 122, for example, by display and storage unit 120. Display and storage unit 120 may also contain an apparatus for supplying control signals and power to acoustic logging tool 100. Typical casing string 108 may extend from wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136 (not illustrated).

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. In examples, acoustic logging tool 100 may include a housing 101 which may protect transmitter 102, receiver 103, and/or other devices disposed within logging tool 100. Without limitation, housing 101 may include a material of a measurable acoustic velocity which may be used below. In examples, housing 101 may include holes and/or grooves in which transmitter 102 and/or receiver 104 may be disposed. Additionally, transmitter 102 and receiver 104 may be disposed in different sub housing or both may be disposed in the same sub housing. For example, transmitter 102 may be disposed in sub housing 102 and receiver 104 may be disposed in sub housing 105. It should be noted that all sub housing may be disposed within housing 101.

As illustrated, one or more receivers 104 may be positioned on acoustic logging tool 100 at selected distances (e.g., axial spacing) away from transmitter 102. The axial spacing of receiver 104 from transmitter 102 may vary, for example, from about 0 inches (0 cm) to about 40 inches (102 cm) or more. In some embodiments, at least one receiver 104 may be placed near the transmitter 102 (e.g., within at least 1 inch (2.5 cm) while one or more additional receivers may be spaced from 1 foot (31 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. The transmitters 102 may include any suitable acoustic source and/or transducer for generating acoustic waves downhole, including, but not limited to, monopole and multipole sources (e.g., dipole, cross-dipole, quadrupole, hexapole, or higher order multi-pole transmitters). Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that can convert acoustic waves into an electric signal.

Figure 2:
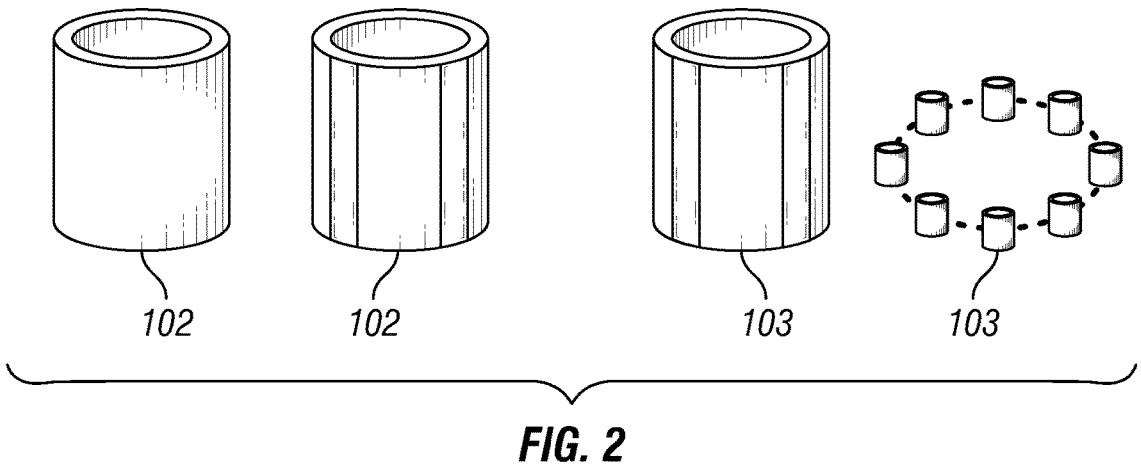
FIG. 2 illustrates an example of a transmitter and a receiver.

FIG. 2 illustrates examples of transmitter 102 and receiver 104. For examples, transmitter 102 may be cylindrical and/or segmented piezoelectric tube. Without limitation, transmitter 102 may be a transducer configured to create and broadcast a pressure pulse. Receivers 104 may include azimuthal receivers, which may record azimuthal variation of bonding behind first casing 134. Without limitation, receiver 104 may be a transducer configured to receive pressure pulse. It should be noted that pressure pulses may also be referred to as acoustic waves.

Referring back to FIG. 1, transmission of acoustic waves by transmitter 102 and the recordation of signals by receivers 104 may be controlled by display and storage unit 120, which may include an information handling system 144. As illustrated, information handling system 144 may be a component of the display and storage unit 120. Alternatively, information handling system 144 may be a component of acoustic logging tool 100. Information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

In examples, acoustic logging tool 100 may be utilized to evaluate the integrity of cement 140 between pipe string 138 and casing string 108 (e.g., Referring to FIG. 1). In examples, acoustic logging tool 100 may be able to evaluate integrity of cement between any two casings, for example, first casing 134 and second casing 136. As disclosed, cement 140 may be evaluated by acoustic logging tool 100 but other materials in wellbore 110 (e.g., Referring to FIG. 1) that may be disposed between pipe string 138 and casing string 108. To evaluate integrity of cement 140 an index may be utilized.

A Quintero Wellbore Index ("QWI") may be implemented to evaluate the integrity of cement 140. The QWI may perform evaluations of integrity of cement 140 based on acoustic corpuscular theory by identifying specific ray paths. In examples, the QWI may use properties and/or characteristics of acoustic logging tool 100 in determining the integrity of cement 140. For example, as discussed above, acoustic logging tool 100 may comprise devices such as transmitters 102 and/or receiver 104 (e.g., referring to FIG. 1 and FIG. 2). The distance between any sensors may be defined as "S." Additionally, the outer radius of transmitter 102 may be defined as $T_{OD}$ and of the outer radius of receiver 104 may be defined as $R_{ao}$.

Figure 3:
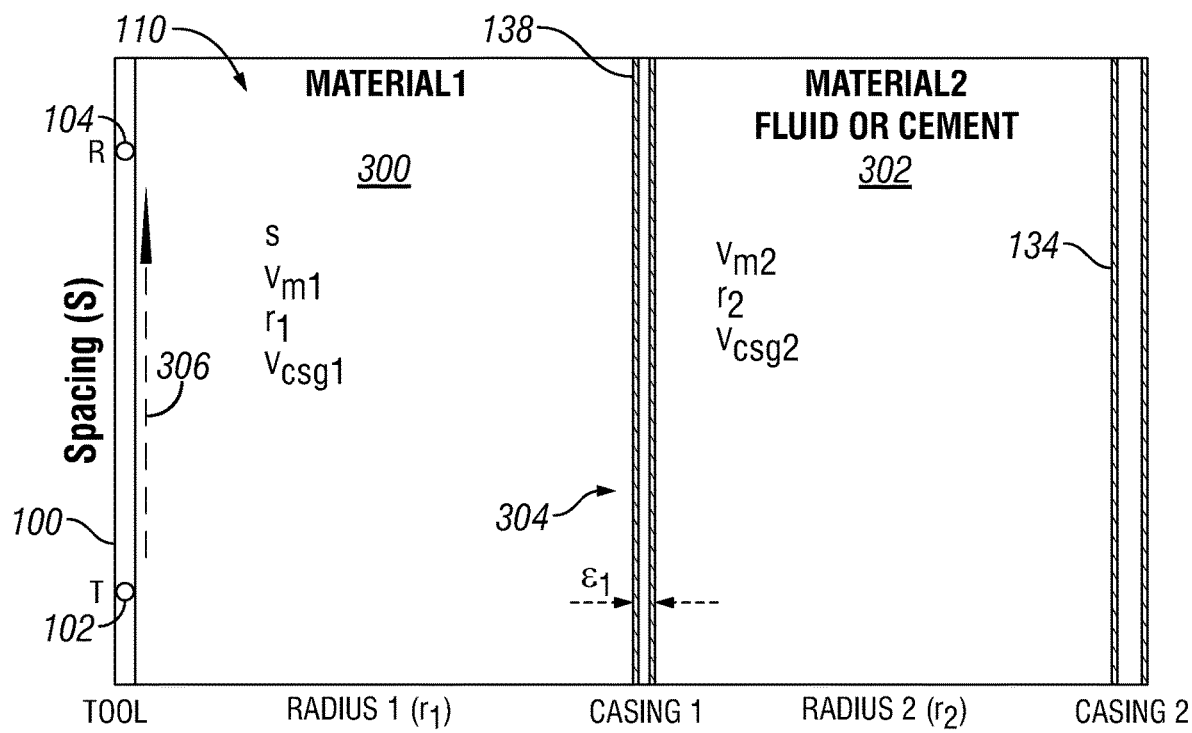
FIG. 3 illustrates an example of a downhole wellbore environment in which the acoustic logging tool may be disposed.

FIG. 3 illustrates an environment that acoustic logging tool 100 may encounter in wellbore 110. As illustrated acoustic logging tool 100 comprising transmitter 102 and/or receiver 104 may be disposed at a variable distance from pipe string 138. Cement 140 (e.g., referring to FIG. 1) may be disposed between pipe string 138 and first casing 134. It should be noted that a first material 300 may be disposed in wellbore 100 and a second material 302 may be cement 140, a fluid, other material, and/or any combination thereof. Additionally, the internal diameter of pipe string 138 is defined as a first radius, $r_1$. Pipe string 138 has a thickness, $\varepsilon_1$, and is made of a certain material of acoustic velocity $V_{cgst}$. Additionally, first material 300 may comprise an acoustic compressional velocity of $V_{m1}$, and may be a fluid such as water, gas, oil, mud, or a very dense material, such as barite, old drilling mud. Similarly, second material 302 may water, gas, oil, mud, or a dense material, such as barite, old drilling mud or solid cement of unspecified density and compressive strength. Second material 302 has a certain acoustic velocity $V_{m2}$, and may be surrounded by either a first casing 134 or a borehole wall. The radius or distance between pipe string 138 and first casing 134 may be defined as $r_2$.

During operations, when transmitter 102 (e.g., Referring to FIG. 1) broadcast a pressure pulse of any given intensity and any duration, the acoustic corpuscular theory of acoustic propagation indicates that every new corpuscle becomes a source. Thus, at an interface 304 between first material 300 and pipe string 138, the point of contact will irradiate a new ray that will transmit to second material 302, and so forth. Theoretical evaluation of the maximum time that the slowest environment may produce is limited by the largest diameter that may be investigated. In such examples, first material 300 and second material 302 may be fluids that include water or gas and the material of pipe string 138 may be steel. The measurement of the pressure pulse through time and sampling may help determine integrity of cement 140.

The QWI may take the information discussed above and use it as an input to determine the integrity of any material. For example, when transmitter 102 transmits a pressure pulse from acoustic logging tool 100 of a given intensity and duration, pipe string 138 may exhibits numerous ray paths, according to acoustic corpuscular theory. It should be noted that pressure pulses travel along ray paths. The use of pressure pulses and ray paths may be used interchangeable as described below. In examples, pressure pulse 306, $A_O$, may be defined as a direct ray between transmitter 102 and receiver 104. The time for receiver 104 to detect default pressure pulse 306, $A_O$, may be determined by two parameters, S and Vm1, of which S is known a priory since is a specification of acoustic logging tool 100. Equation 1 may be used to determine the time for receiver 104 to detect default pressure pulse 306, $A_O$, shown below:

$$tA_o = \frac{S}{V_{m1}} \quad (1)$$

Figure 4:
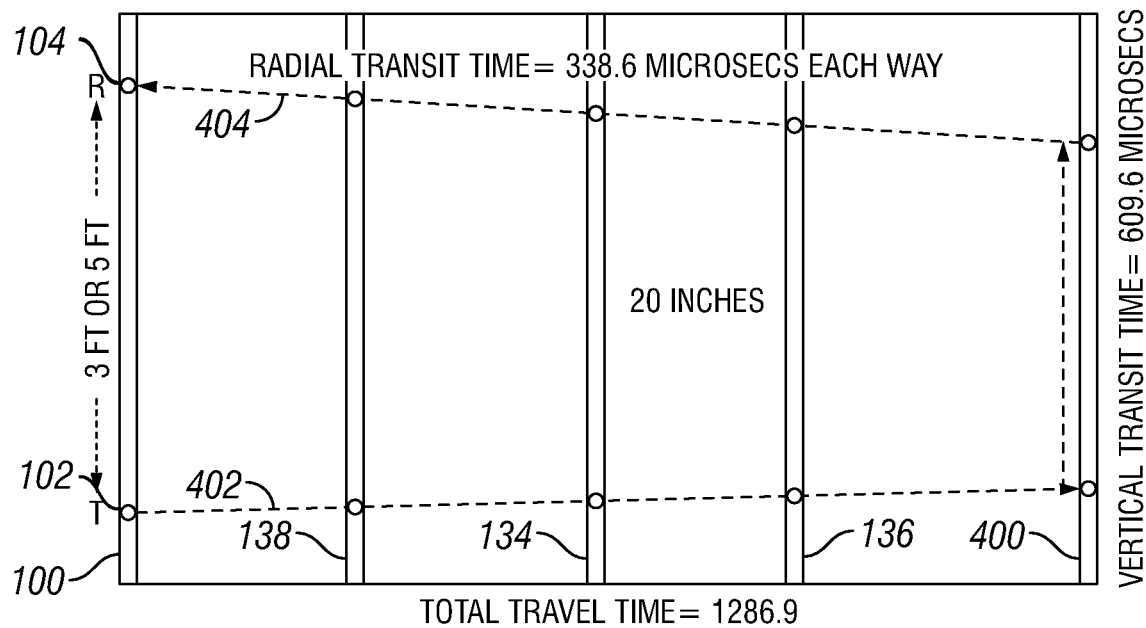
FIG. 4 illustrates a ray being transmitted and reflected across a plurality of casings.

FIG. 4 further illustrates a pressure pulse moving along a ray 402, A1. As illustrated, ray 402, or pressure pulse, may be transmitted from transmitter 102, reach interface between a first material and pipe string 138, reflect off the interface and disturb default pressure pulse 400, $A_O$, disposed on acoustic logging tool 100. The number of ray paths, or pressure pulses, increases as new environments and interfaces may be encountered. The methods disclosed herein may not be limited by any number of transmitted rays.

FIG. 4 illustrates a reflected pressure pulse along ray 404 recorded by receiver 104 (i.e., referring to FIG. 1). As the pressure pulse arrives at receiver 104, it may disturb a reflected pressure pulse that receiver 104 may also be recording. Although the pressure pulses themselves are multiple and with complex interference patterns, the QWI method may be implemented when a recorded reflected pressure pulse disturbs the status-quo. For example, generally, at around 300 microseconds a disturbance may occur. A disturbance may also occur at about 600 and 750 microseconds. The QWI may be able to explain and predict when these disturbances occur.

For example, referring to FIG. 4, since the time when a new pressure pulse arrives is given by equations that depend on the acoustic velocity of material between pipe string 138, first casing 134, second casing 136, and third casing 400 (e.g., first material 300 and second material 302 of FIG. 3) an inverse model of these times yields those velocities. For example, the time of arrival of a ray 402 or ray 404, ($t_{c1}$), may be predicted using the equation below:

$$tC_1 = \frac{2r_1}{V_{m1}} + \frac{2_{wcsg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}} \quad (2)$$

If third material is cement, the velocity of said cement, $V_{m3}$ will have direct influence on ray 402 or ray 404, (tc1). The QWI may include a series of indices, whereby the theoretical arrival time of a ray path influenced by zones, which may include specified material, may be evaluated and may be compared to the range of arrival times in the extremes of 100% water and 100% solid, fast cement. The equation below may be a general relationship of the QWI of a zone of interest.

$$QWI = \left( \frac{\text{Arrival time of appropriate ray} - }{\text{Arrival time of theoretical ray with fast cement}} \middle/ \frac{\text{Arrival time of theoretical ray if zone 100\%}}{\text{filled with water} - \text{Arrival time of } theoretical ray \text{ with fast cement}} \right) \quad (3)$$

If the zone of interest, as illustrated in FIG. 4 is from acoustic logging tool 100 to third casing 400, is examined by ray 402 and ray 404, for example, as in the case presented above, then:

$$QWI = \left( \frac{t_{C1} - t_{C1(fast\ cement)}}{t_{C1(100\%\ water)} - t_{C1(fast\ cement)}} \right) \quad (4)$$

Figure 5:
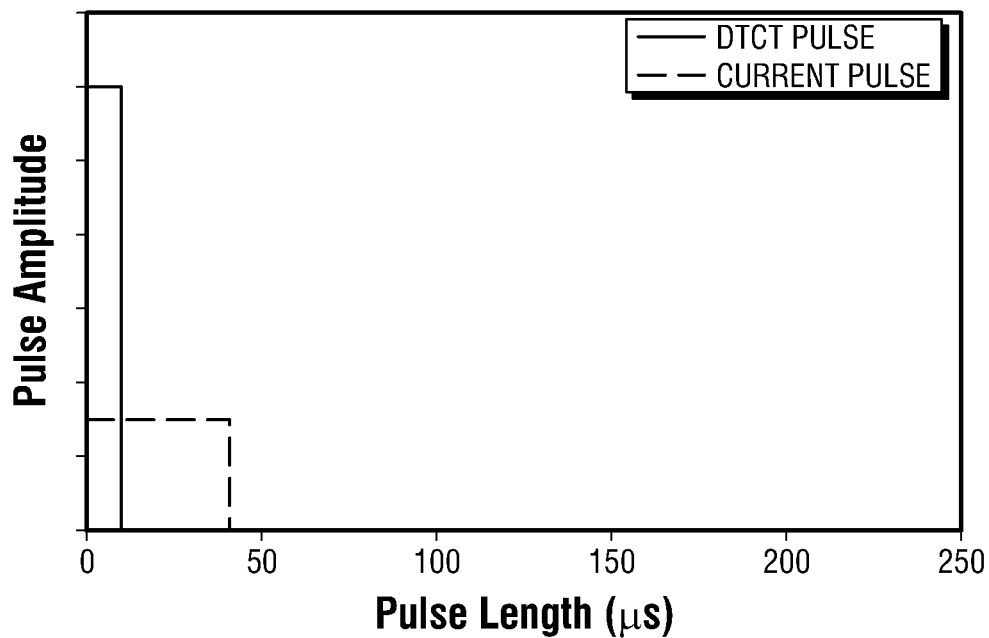
FIG. 5 is a graph of pulse lengths transmitted by the acoustic logging tool.

Therefore, utilizing the equations above for the QWI, the integrity of any material in a wellbore may be determined as well as the time it may take for a pressure pulse to be transmitted and received during logging operations. As an example, in FIG. 4, there may be a spacing of about 3 ft. (about 1 meter) between transmitter 102 and receiver 104 on acoustic logging tool 100. Additionally, in a concentric set of pipes (i.e., pipe string 138, first casing 134, second casing 136, and third casing 400) where about 20 inches (about 50 cm) may be a maximum diameter, the maximum length of the QWI rays, is given approximately by dividing the total radial distance by the slowest material velocity. This value, in water of 1,500 m/s, gives 677 microseconds of total radial time (radial time transmitted along ray 402 and radial time reflected along ray 404). It should be noted that time measurements may begin at broadcasting of a pressure pulse by transmitter 102 (e.g., referring to FIG. 1) and may end when recording the reflected pressure pulse by receiver 104 (e.g., referring to FIG. 1). If the total vertical length is also traveled by water, the vertical time is 609 microseconds. The total travel time in such a case is approximately 1287 microseconds as shown in FIG. 4. Similarly, for a about a 5 ft. spacing (about 1.5 meters), the total travel time is 1693 microseconds. Acoustic logging tool 100 may record up to 2000 (two thousand microseconds), which may be more than needed in an environment which may slow the path of a ray. It should be noted that ray 402 and ray 404 may indicate the path of the pressure pulse and a path of the reflected pressure pulse. Since acoustic logging tool 100 records only a fraction of the current recording time, sampling rate may also be increased accordingly. Increasing the sampling rate may improve signal-to-noise ratio in late interface arrivals For example, FIG. 5 illustrates a graph of pulse amplitude in view of pulse length. As illustrated, current technology produces a pressure pulse with a smaller amplitude that may have a longer duration. This may reduce power consumption as the smaller amplitude consumes less energy. As described herein, transmitter 102 (e.g., referring to FIG. 1) may produce a pressure pulse of higher amplitude but for a shorter duration, which may consume more energy.

Figure 6:
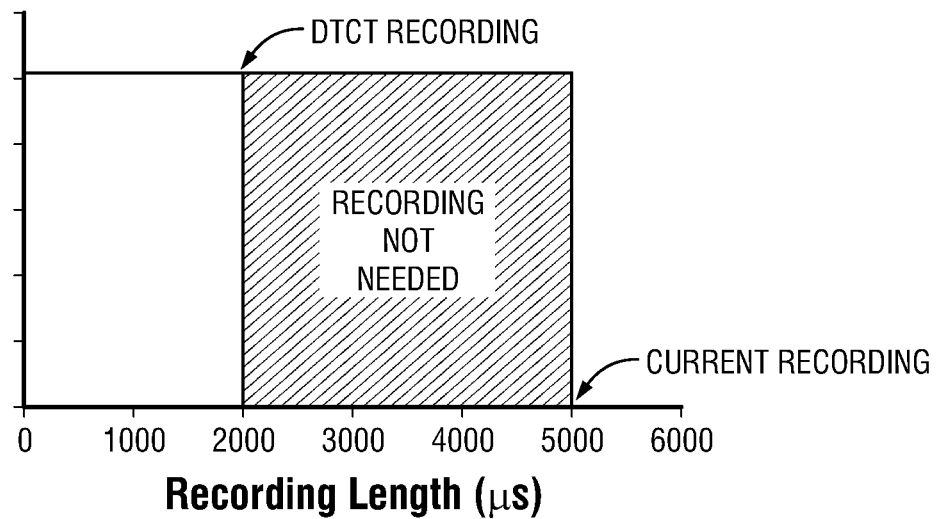
FIG. 6 is a graph of recording rate for the acoustic logging tool.

FIG. 6 illustrates a graph of recording time of receiver 104 (e.g., referring to FIG. 1). As illustrated, current technology may record for as long as 5,000 µs. Receiver 104 as disclosed herein may only record up to 2000 µs. This may allow receiver 104 to deactivate and prepare for additional recordings faster, as less recording time is needed. Therefore, the sampling rate of receiver 104 may be increased, which may allow acoustic logging tool 100 to log faster than previous technology.

Figure 7:
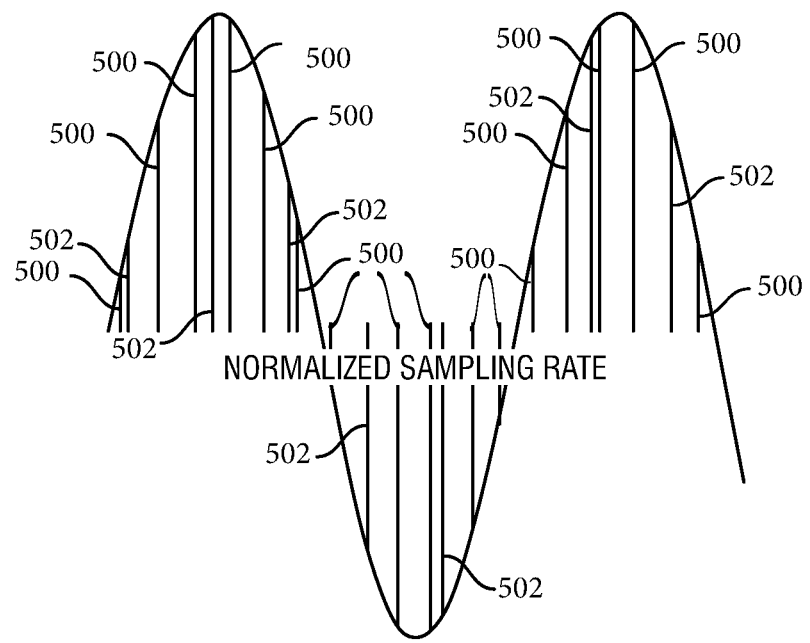
FIG. 7 is a graph for increased sampling rate for the acoustic logging tool.

FIG. 7 illustrates the different points along a wavelength that sampling rates are taken. For example, as discussed in FIGS. 5 and 6, sampling rate 500 of receiver 104 is identified at multiple points along the wavelength. However, current sampling rate 502 is identified with less frequency than sampling rate 500. This shows that increasing amplitude of a pressure pulse (as seen in FIG. 5) and reducing the duration of recording (as seen in FIG. 6) may allow for acoustic logging tool 100 to have a larger number of sampling rates 500 along the wavelength the current sampling rate 10 found currently in the public domain.

FIGS. 5-7 illustrate that instead of four microseconds, acoustic logging tool 100 may be designed to obtain a sample every one microsecond. This feature may allow for shorter recording times, which may allow acoustic logging tool 100 to perform logging operations faster. Additionally, by reducing a pressure pulse length to ten microseconds, from a standard pressure pulse length of forty microseconds, the pulse amplitude may increase by 250%, hence increasing the signal-to-noise ratio in late interface arrivals.

Accordingly, the present disclosure generally relates to methods and systems for identifying cement bonding as well as materials behind a pipe string and/or casing with an acoustic logging tool. The systems and methods may include any of the various features of the systems and methods disclosed herein, including one or more of the following statements.

Statement 1. A well measurement system for determining cement bonding may comprise an acoustic logging tool, wherein the acoustic logging tool comprises: at least one transmitter, wherein the at least one transmitter is configured to broadcast a pressure pulse; and at least one receiver; wherein the at least one receiver is configured to record the reflected pressure pulse; and an information handling system, wherein the information handling system is configured to determine an integrity of a material using a Quintero Wellbore Index based at least in part on the reflected pressure pulse, wherein the Quintero Wellbore Index is a series of indices including one or more arrival times of one or more rays through a zone of interest.

Statement 2. The well measurement system of statement 1, wherein the acoustic logging tool comprises a housing and the housing has a specific acoustic velocity.

Statement 3. The well measurement system of statement 2, wherein the housing comprises holes or grooves.

Statement 4. The well measurement system of statements 1 or 2, wherein a travel time for a first ray is determined by the Quintero Wellbore Index using $$tA_o = \frac{\sqrt[2]{r_1^2 + y_1^2} + (S - 2y_1)}{V_{m1}},$$

wherein $tA_o$ is the travel time, $r_1$ is a first radius, y is the first ray location on an x and y plane, S is a distance between the transmitter and the receiver, and $V_{m1}$ is an acoustic compressional velocity.

Statement 5. The well measurement system of statements 1, 2, or 4, wherein a time of arrival of a first ray is determined by the Quintero Wellbore Index using $$tC_1 = \frac{2r_1}{V_{m1}} + \frac{2w_{csg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, and $V_{m3}$ is an acoustic compressional velocity of a third material.

Statement 6. The well measurement system of statements 1, 2, 4, or 5, wherein the transmitter and the receiver are transducers, and the transmitter has a radius defined as $r_t$ and the receiver has a radius defined as $r_R$.

Statement 7. The well measurement system of statements 1, 2, or 4-6, wherein the at least one receiver is operable to record a sample every one microsecond.

Statement 8. The well measurement system of statements 1, 2, or 4-7, wherein the sample records the reflected pressure pulse.

Statement 9. The well measurement system of statements 1, 2, or 4-8, wherein the at least one transmitter is operable to transmit a pressure pulse for ten microseconds.

Statement 10. A method for determining cement bonding may comprise: disposing an acoustic logging tool in a wellbore, wherein the acoustic logging tool comprises a transmitter and a receiver; broadcasting a pressure pulse with the transmitter into a first material, wherein the pressure pulse reflects off an interface of the first material and a pipe string as a reflected pressure pulse; recording the reflected pressure pulse with a receiver; and determining an integrity of a cement using a Quintero Wellbore Index based at least in part on the reflected pressure pulse, wherein the Quintero Wellbore Index is a series of indices including one or more arrival times of one or more rays through a zone of interest.

Statement 11. The method of statement 10, further comprising recording a sample every one microsecond.

Statement 12. The method of statements 10 or 11, wherein the sample records the reflected pressure pulse.

Statement 13. The method of statements 10-12, further comprising transmitting a pressure pulse for ten microseconds.

Statement 14. The method of statements 10-13, wherein the transmitter is a dipole, a cross-dipole, or a hexapole.

Statement 15. The method of statements 10-14, wherein the acoustic logging tool comprises a housing and the housing has a specific acoustic velocity.

Statement 16. The method of statement 15, wherein the housing comprises holes or grooves.

Statement 17. The method of statements 10-15, wherein receiver is disposed in a first sub housing and transmitter is disposed in a second sub housing.

Statement 18. The method of statements 10-15 or 17, wherein the first sub housing and the second sub housing are disposed in the housing of the acoustic logging tool.

Statement 19. The method of statements 10-15, 17, or 18, wherein a travel time for a first ray is determined by the Quintero Wellbore Index using $$tA_o = \frac{\sqrt[2]{r_1^2 + y_1^2} + (S - 2y_1)}{V_{m1}},$$

wherein $tA_0$ is the travel time, $r_1$ is a first radius, y is the first ray location on an x and y plane, S is a distance between the transmitter and the receiver, and $V_{m1}$ is an acoustic compressional velocity.

Statement 20. The method of statements 10-15 or 17-19, wherein a time of arrival of a first ray is determined by the Quintero Wellbore Index using $$tC_1 = \frac{2r_1}{V_{m1}} + \frac{2wcsg1}{V_{csg1}} + \frac{2r_2}{V_{m2}} + \frac{\sqrt[2]{r_3^2 + y_3^2}}{V_{m3}} + \frac{(S - 2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, and $V_{m3}$ is an acoustic compressional velocity of a third material.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A well measurement system for determining integrity of a material comprising:
   an acoustic logging tool, wherein the acoustic logging tool comprises:
      at least one transmitter to broadcast a pressure pulse; and
      at least one receiver to record the reflected pressure pulse; and
   an information handling system, wherein the information handling system is configured to determine the integrity of the material using a Quintero Wellbore Index based at least in part on the reflected pressure pulse, wherein the Quintero Wellbore Index is a series of at least two indices, wherein each index from the series of at least two indices comprises one or more ray paths with one or more arrival times through a zone of interest, wherein the zone of interest is separated by a pipe string or a casing for each index from the series of at least two indices.

2. The well measurement system of claim 1, wherein the acoustic logging tool comprises a housing and the housing has a specific acoustic velocity.

3. The well measurement system of claim 2, wherein the housing comprises holes or grooves.

4. The well measurement system of claim 1, wherein a travel time for a first ray is determined by the Quintero Wellbore Index using $$tA_o = \frac{\sqrt[2]{r_1^2 + y_1^2} + (S - 2y_1)}{V_{m1}},$$

wherein $tA_0$ is the travel time, $r_1$ is a first radius, y is the first ray location on an x and y plane, S is a distance between the transmitter and the receiver, and $V_{m1}$ is an acoustic compressional velocity.

5. The well measurement system of claim 1, wherein a time of arrival of a first ray is determined by the Quintero Wellbore Index using $$tC_1 = \frac{2r_1}{V_{m1}} + \frac{2w_{csg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, and $V_{m3}$ is an acoustic compressional velocity of a third material.

6. The well measurement system of claim 1, wherein the transmitter and the receiver are transducers, and the transmitter has a radius defined as $r_t$ and the receiver has a radius defined as $r_R$.

7. The well measurement system of claim 1, wherein the at least one receiver records the reflected pressure pulse at a sample rate of at least one sample per microsecond.

8. The well measurement system of claim 1, wherein the at least one transmitter is operable to transmit a pressure pulse for ten microseconds.

9. The well measurement system of claim 1, wherein a general relation of the Quintero Wellbore Index for the zone of interest is determined by, $$QWI = \left( \frac{\text{Arrival time of appropriate ray} - \text{Arrival time of theoretical ray with fast cement}}{\text{Arrival time of theoretical ray if zone 100\% filled with water} - \text{Arrival time of } theoretical ray \text{ with fast cement}} \right).$$

10. The well measurement system of claim 1, wherein the at least one transmitter is a first piezoelectric element, a bender bar, or a transducer and the at least one receiver is a second piezoelectric element, a second bender bar, or a second transducer.

11. The well measurement system of claim 1, wherein the integrity of the material is a cement bonding to a pipe string or a casing.

12. A method for determining integrity of a material, comprising:
    disposing an acoustic logging tool in a wellbore, wherein the acoustic logging tool comprises a transmitter and a receiver;
    broadcasting a pressure pulse with the transmitter into a first material, wherein the pressure pulse reflects off an interface of the first material and a pipe string as a reflected pressure pulse;
    recording the reflected pressure pulse with a receiver; and
    determining the integrity of the material using a Quintero Wellbore Index based at least in part on the reflected pressure pulse, wherein the Quintero Wellbore Index is a series of at least two indices, wherein each index from the series of at least two indices comprises one or more ray paths with one or more arrival times through a zone of interest, wherein the zone of interest is separated by a pipe string or a casing for each index from the series of at least two indices.

13. The method of claim 12, wherein the at least one receiver records the reflected pressure pulse at a sample rate of at least one sample per microsecond.

14. The method of claim 12, further comprising transmitting a pressure pulse for ten microseconds.

15. The method of claim 12, wherein the transmitter is a dipole, a cross-dipole, or a hexapole.

16. The method of claim 12, wherein the acoustic logging tool comprises a housing and the housing has a specific acoustic velocity.

17. The method of claim 16, wherein the housing comprises holes or grooves.

18. The method of claim 12, wherein receiver is disposed in a first sub housing and transmitter is disposed in a second sub housing.

19. The method of claim 18, wherein the first sub housing and the second sub housing are disposed in the housing of the acoustic logging tool.

20. The method of claim 12, wherein a travel time for a first ray is determined by the Quintero Wellbore Index using $$tA_o = \frac{\sqrt[2]{r_1^2 + y_1^2} + (S - 2y_1)}{V_{m1}},$$

wherein $tA_0$ is the travel time, $r_1$ is a first radius, y is the first ray location on an x and y plane, S is a distance between the transmitter and the receiver, and $V_{m1}$ is an acoustic compressional velocity.

21. The method of claim 12, wherein a time of arrival of a first ray is determined by the Quintero Wellbore Index using $$tC_1 = \frac{2r_1}{V_{m1}} + \frac{2w_{csg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, and $V_{m3}$ is an acoustic compressional velocity of a third material.

22. The method of claim 12, wherein a general relation of the Quintero Wellbore Index for the zone of interest is determined by, $$QWI = \left( \frac{\text{Arrival time of appropriate ray} - \text{Arrival time of theoretical ray with fast cement}}{\text{Arrival time of theoretical ray if zone 100\% filled with water} - \text{Arrival time of } theoretical ray \text{ with fast cement}} \right).$$

23. The method of claim 12, wherein the transmitter is a first piezoelectric element, a bender bar, or a transducer and the receiver is a second piezoelectric element, a second bender or, or a second transducer.

24. The method of claim 12, wherein the integrity of the material is a cement bonding to the pipe string or a casing.

25. A well measurement system for determining integrity of a material comprising:
    an acoustic logging tool, wherein the acoustic logging tool comprises:
        at least one transmitter to broadcast a pressure pulse; and
        at least one receiver to record the reflected pressure pulse at a sample rate of at least one sample per microsecond; and
    an information handling system, wherein the information handling system is configured to determine the integrity of the material using a Quintero Wellbore Index based at least in part on the reflected pressure pulse, wherein the Quintero Wellbore Index is a series of indices, wherein each index from the series of indices comprises one or more ray paths with one or more arrival times through a zone of interest, wherein a general relation of the Quintero Wellbore Index for the zone of interest is determined by, $$QWI = \left( \frac{\text{Arrival time of appropriate ray} - \text{Arrival time of theoretical ray with fast cement}}{\text{Arrival time of theoretical ray if zone 100\% filled with water} - \text{Arrival time of } \textit{theoretical ray} \text{ with fast cement}} \right).$$

* * * * *